United States Patent [19]
Frigo et al.

[11] Patent Number: 5,742,414
[45] Date of Patent: Apr. 21, 1998

[54] MULTIPLICITY OF SERVICES VIA A WAVELENGTH DIVISION ROUTER

[75] Inventors: Nicholas J. Frigo, Atlantic Highlands; Patrick P. Iannone, Edison; Adel Abdel Moneim Saleh, Holmdel, all of N.J.

[73] Assignee: AT&T Corp., Middletown, N.J.

[21] Appl. No.: 718,856

[22] Filed: Sep. 24, 1996

[51] Int. Cl.$^6$ .............................. H04J 14/02; H04J 14/08
[52] U.S. Cl. .......................... 359/125; 359/132; 359/137; 359/167
[58] Field of Search ..................... 359/123–128, 359/132, 135, 137, 139, 167

[56] References Cited

U.S. PATENT DOCUMENTS

| | | | |
|---|---|---|---|
| 4,773,063 | 9/1988 | Hunsperger et al. | 370/3 |
| 5,136,671 | 8/1992 | Dragone | 385/46 |
| 5,221,983 | 6/1993 | Wagner | 359/125 |
| 5,311,344 | 5/1994 | Bohn et al. | 359/125 |
| 5,455,699 | 10/1995 | Glance et al. | 359/125 |
| 5,488,680 | 1/1996 | Dragone | 385/24 |
| 5,493,625 | 2/1996 | Glance | 359/128 |
| 5,506,712 | 4/1996 | Sasayama et al. | 359/123 |

OTHER PUBLICATIONS

C. Dragone, "An N×N Optical Multiplexer Using a Planar Arrangement of Two–Star Couplers," IEEE Photonics Technology Letters, vol. 3, No. 9, Sep. 1991, pp. 812–815.
J. R. Stern et al., "Passive Optical Local Networks for Telephony Applications and Beyond," Electronics Letters, vol. 23, No. 24, Nov. 19, 1987, pp. 1255–1257.
M. H. Reeve et al., "LED Spectral Slicing for Single–Mode Local Loop Applications," Electronics Letters, vol. 24, No. 7, Mar. 31, 1988, pp. 389–390.
S.S. Wagner et al., "Experimental Demonstration of a Passive Optical Subscriber Loop Architecture," Electronics Letters, vol. 24, No. 6, Mar. 17, 1988, pp. 344–346.
"Multichannel Optical Network Using Optical Subcarrier Multiplexing," IBM Technical Disclosure Bulletin, vol. 33, No. 9, Feb. 1991, pp. 218–221.
N. J. Frigo et al., "RITE–Net: A Passive Optical Network Architecture Based on the Remote Interrogation of Terminal Equipment," OFC '94 Technical Digest, Feb. 20–25, 1994, pp. 43–45.
M. Zirngibl et al., "A High Performance, 12 Wavelength Optical Multi–Channel Controller," Integrated Photonics Research, Feb. 17–19, 1994, pp. PD2–1 through PD2–4.
M. Zirngibl et al., "A 12–Frequency WDM Laser Source Based on a Transmissive Waveguide Grating Router," OFC '94 Technical Digest, Feb. 20–25, 1994, pp. 75–78.
C. Dragone et al., "Integrated Optics N×N Multiplexer on Silicon," IEEE Photonics Technology Letters, vol. 3, No. 10, Oct. 1991, pp. 896–899.

*Primary Examiner*—Kinfe-Michael Negash
*Attorney, Agent, or Firm*—Henry T. Brendzel

[57] ABSTRACT

An improved communication arrangement includes a head station is connected to a router and delivers a signal to the router that is adjusted to the granularity of the free spectral range (FSR) of the router. At a minimum, a signal is broadcast to all outputs of the router, to which network interface units may be connected, with a modulated carrier that spans as little as one FSR interval. Two independent signals are delivered to the network interface units by adding a second carrier that may be as close as at an adjacent FSR interval. In a telecommunication environment, the head station may be a central office-like station which serves a plurality of customers and which provides the expected private communication. Additionally, it provides new broadcast services, such as TV broadcast (much like cable systems currently do) and other multi-media services.

40 Claims, 11 Drawing Sheets

MULTIPLICITY OF SERVICES VIA A WAVELENGTH DIVISION ROUTER

BACKGROUND OF THE INVENTION

1. Field of the invention

This invention relates to wavelength-division multiplexed passive optical networks.

2. Description of Prior Art

U.S. patent application Ser. No. 08/527,967, filed on Sep. 14, 1995, discloses an arrangement for a passive optical network (PON) that includes a broadcast overlay, and is hereby incorporated by reference. More specifically, it discloses a central office that transmits downstream optical signals to remote nodes, and each remote node passes a downstream optical signal to network interface units. In one of the disclosed embodiments, shown in FIG. 1, the remote unit comprises a wavelength division multiplexing router preferably of the type disclosed by C. Dragone in an article titled "An N×N Optical Multiplexer Using a Planar Arrangement of Two Star Couplers," *IEEE Phot. Technol. Lett.*, Vol. 3, No. 9, September, 1991, pg. 812 et seq., and in U.S. Pat. No. 5,136,671, issued on Aug. 4, 1992.

The wavelength division multiplexing router includes at least one input port and a plurality of output ports, and is such that there is effectively a low loss optical path between an input port and each output port at a set of wavelengths, or optical frequencies, and the low loss path connecting each output port and a given input port is preferably different in frequency than those for all other output ports. Described differently, with a wide optical bandwidth signal applied to an input port, each port j of the router's N output ports delivers optical signals at frequencies $f^{j+mN}$, where m is an integer to a first degree of approximation, $f^j \ne f^k$, and k is the port designation of a port other than j and no m and n pairs exist such that jm=jn. Conversely, all signals with frequencies $f^{j+mN}$ that are applied to output port j are communicated to the input port. In other words, the router is reciprocal.

FIG. 2 illustrates the spectra out of a WDM router that is constructed in accordance with the prior art teachings by C. Dragone. In FIG. 1, each port j is able to deliver an output signal at a predesigned frequency $f^j$ and at other frequencies that are removed from $f^j$ by an integer number of free spectral ranges (FSRs). To a first degree of approximation, as illustrated in FIG. 2, the frequencies corresponding to $f^{j+mN}$ form a periodic set. That is, the separation between $f^{j+mN}$ and $f^{j+(m+1)N}$ is roughly constant, independent of m. The FSR of a router is the frequency interval between signals at wavelengths $f^{j+mN}$ and $f^{j+mN+N}$.

In accordance with one embodiment disclosed in the aforementioned application Ser. No. 08/527,967, point-to-multipoint communication is attained from the "central office" to the network interface units (NIUs) by the central office selecting or generating a relatively broad band spectrum, for example with an LED working in the 1.5 µm-wavelength communication band, appropriately modulating that broad band carrier with the signals destined to all the NIUs, and passing the modulated signal to a remote router node. The node distributes the signal to the NIUs in accordance with the router's characteristics. As a result, all NIUs receive the central office's signal, and in a very real sense the signal has been broadcast to the NIUs. Point-to-multipoint communication is achieved by the central office modulating the LED's signal with TDM signals or with subcarriers, and each NIU is timed to a particular time slot or a subcarrier. The physical signals corresponding to private information are all physically accessible to all NIUs, since they are broadcast, but privacy is achieved with electronic tuning (in time or in frequency) within the NIUs.

The aforementioned application notes that because each of the ports receives a set of signals which sample the spectrum, the characteristics of the router cause each output port to receive approximately the same optical power (assuming that the wavelength spread of the LED is large relative to the router's free spectral range). Moreover, because it is a set of signals that is received, each at a different wavelength, drift in the LED's wavelength or changes in the LED's spectral width does not significantly affect performance. These are two important advantages over conventional WDM passive optical networks (PONs).

FIG. 3 illustrates these advantages. Two broad optical spectra, source A and source B, are applied to the router and emerge from output ports 1 through 4. Source A is shown as a solid curve 41 and source B is dashed curve 42. The output spectra corresponding to ports 1, 2, and 4 are also shown in traces marked #1, #2, and #4. Although a distinct set of frequency bands emerges from each output port, the spectral envelopes corresponding to source A and source B are substantially equal, and therefore substantially equal optical powers emerge from each port. Furthermore, the fact that the two input spectra are displaced in absolute frequency does not hamper the performance of this embodiment, indicating that the embodiment is unaffected by drift of the optical signals.

To return a signal to the central office, the disclosure employs signals in another communications band, such as at 1.3 µm wavelength. To avoid collisions of the returning NIU signals that are combined in the router, the disclosure suggests use of scheduling, sub-carrier multiplexing, or wavelength division multiplexing. Scheduling is a form of time division multiplexing, where the signals from each NIU are relegated to predefined, calibrated, time slots in accordance with a system clock and NIU location. Sub-carrier multiplexing (SCM) is an arrangement where optical signals transmitted from each optical network unit or central office are coded into a unique RF subcarrier that modulates the light. Wavelength-division multiplexing is a technique by which appropriate wavelengths are de-multiplexed and sent to individual receivers.

In another embodiment, the disclosure presents a broadcast broadband video overlay to the point-to-multipoint arrangement. In this arrangement, the central office includes a 1.5 µm LED for point-to-multipoint narrowband transmission (i.e. telephony, data, etc.) as described above, and in addition, another LED is used for broadcasting a broadband video signal to all of the NIUs. This "broadcast LED" signal is combined with the "point-to-multipoint LED" signal when sent to the router. The signals of the two LEDs can be in the same wavelength communication band or in different communication bands. When in the same band, the disclosure suggests the private signals and the video signals can be separated by utilizing time division multiplexing, or SCM. When in different bands, such as when the point-to-multipoint signals are in the 1.5 µm band and the broadcast signal is in the 1.3 µm band, a WDM protocol, a TDM protocol or a SCM protocol may be suitably used to separate the signals.

SUMMARY

An improvement in the art is achieved through a realization that the lowest granularity that can be advantageously employed is one that focuses in on the FSR interval. With such an approach, a signal is broadcast to all network interface units with an optical carrier that spans as little as one FSR interval, and another, independent, signal can be delivered to the network interface units by adding a second carrier that may be at an adjacent FSR interval. Thus, in accordance with the above insight, an arrangement is disclosed comprising a head station connected to a router that is, in turn, connectable to network interface units. The arrangement can offer a plurality of services, where some services carry public broadcast information and some can carry private information, and where each service is delivered over a bandwidth that spans one, a few, or many FSRs. Those services can reside in a single communication band, such as the 1.5 μm band, or in different communication bands. Those services can be in adjacent FSR intervals, separated by less than one FSR interval, separated by a whole FSR interval, or separated by many FSR intervals. Return signals from the router ports to the head station can also be assigned one or a number of FSR intervals, to permit one or more distinct channels from each NIU back to the signal source.

In a telecommunication environment, the head station may be a central office-like station which serves a plurality of customers and which provides the expected private communication. Additionally, it provides broadcast services, such as TV broadcast (much like cable systems currently do) and other multi-media services.

DETAILED DESCRIPTION

To facilitate our description, we first set out several definitions of some of the concepts that are used in this disclosure:

A "broadcast connection" is a communication link for which all NIUs receive a portion of a single signal, each portion having been encoded with identical information. Communication busses are examples of these. In such a connection, the subscriber tunes to, or "pulls in," his intended signal from the plurality of signals he receives.

A "switched connection" is one for which an NIU receives a distinct signal having been encoded with identical or distinct optical information. Telephones are examples of these. In these connections, the hub station sorts the signals before transmission, and bears the responsibility for sending the signals so that the NIU receives only its intended signals.

The broadcast and switched connections serve as bearers of services.

A "broadcast service" is one in which, by intention, all subscribers on a communication node receive the same set of signals. Television is an example of a broadcast service.

A "switched service" is one in which each subscriber receives an individually selected signal. Telephony on private lines is an example of this.

A "multi-cast service" is an intermediate case, in which more than one, but not all of the subscribers receive the same signal. It is clear that broadcast connections are more favorable for delivery of broadcast services and switched connections are more favorable for delivery of switched services, but each connection type can bear each type of service.

We will have occasion to discuss regions of the optical spectrum, as well.

By "telecommunications band" we mean the wide (e.g. 100 nm) regions of spectrum for which standards are commonly applied, such as the portions of spectrum in the 1.3 μm and 1.5 μm wavelength ranges.

"Bands" refer to subsets of these telecommunications bands which will be segregated for distinct purposes. Similarly, we will discuss optical source characteristics.

By "line sources" we mean sources such as lasers which emit light in essentially single optical modes, much narrower than the typical filter passbands (nm) we discuss.

"Multiwavelength sources" are sources which have the capability to act as a plurality of line sources by emitting in several distinct single optical modes.

By "broadband sources," however, we mean sources that are generally wider than the free-spectral range (several nanometers and greater) of the routers we discuss. In some cases, we will focus on sources that by design or filtering have narrower output spectra, on the order of the free spectral range of the filters we discuss, and we call these "restricted broadband sources." Although in the main, both broadband and restricted broadband sources have what is commonly called a "continuous" optical spectrum, it is within the meaning for these sources to have a portion of their optical spectrum removed or "notched out," as we will describe later.

Figure 1:
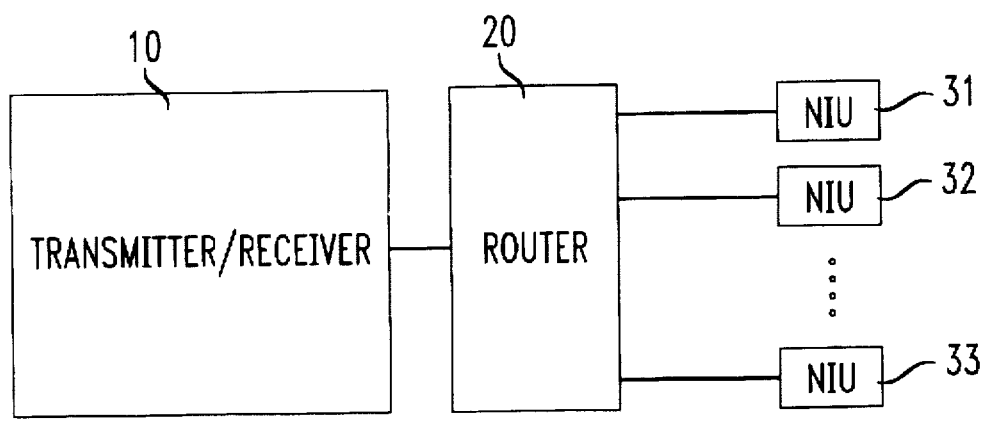
FIG. 1 presents a block diagram connecting a head station to a WDM router.
Figure 2:
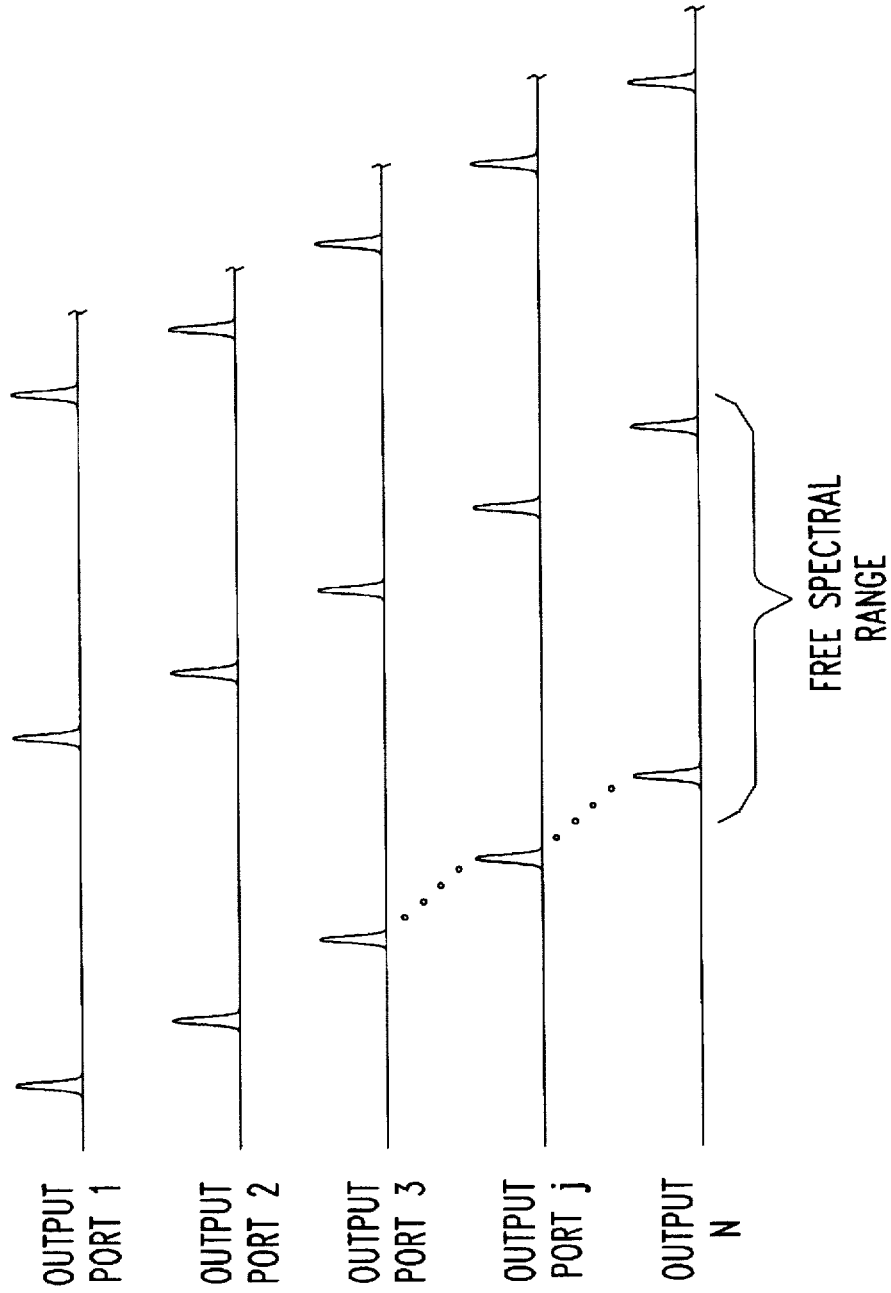
FIG. 2 presents a pictorial view of the spectra delivered at the output ports of a wavelength division multiplexing router, in the case where the input spectrum is flat.

FIG. 1 presents an embodiment where a router 20 of the type able to deliver signals as described in FIG. 2 is connected to a head station 10. Head station 10 can comprise transmitter apparatus only, or both transmitter apparatus and receiver apparatus. Both embodiments are described more fully below. In accordance with the principles disclosed herein, station 10 is fashioned to capitalize on the properties of router 20 to establish broadcast or switched connections between the head station 10 and network interface units (NIU) 31, which each serve one or more users. In its most general sense, the advance in the art which is disclosed herein can be embodied wholly within station 10.

More specifically, the enhancement contemplated by the arrangement presented in FIG. 1 lies in the realization that by zeroing in on the granularity of the free spectral range (FSR) of the router 20, rather than on the much coarser granularity of the telecommunication bands (e.g., the 1.3 μm band and the 1.5 μm band), a rich set of signals can be easily provided to the output ports of router 20. That is, not only that many different services may be provided to a particular port of router 20, but that the structure of FIG. 1 can offer both private and public broadcast services to any and all ports of router 20.

Figure 4:
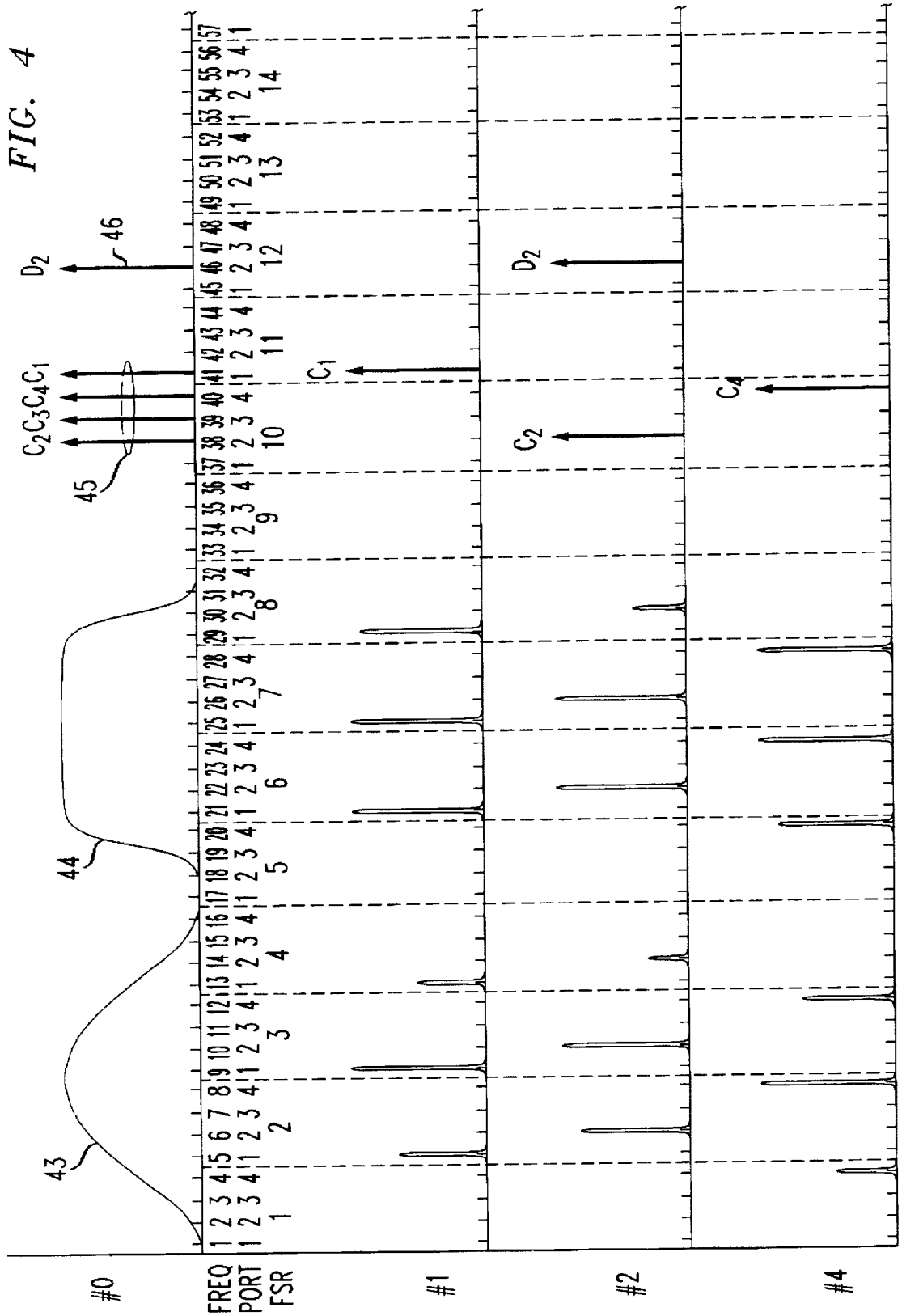
FIG. 4 illustrates the use of several distinct optical frequency bands to provide various services.

FIG. 4 illustrates an arrangement where one or more service providers can employ several optical bands within a telecommunications band to provide multiple services to output ports of router 20, where router 20 is illustratively chosen to have only 4 output ports. The FIG. 4 portion marked by #0 represents the optical bands input to router 20. The first two optical bands contain the spectra from sources A and B, curves 43 and 44 respectively, which are broadband optical spectra spanning at least one FSR of router 20 and are used to establish broadcast connections. The third optical band contains optical signals from two line sources, which are used to establish switched connections. The first, source C (group 45), is a multi-frequency source, capable of generating a plurality of optical lines whose frequencies match each of the unique router port wavelengths included within one free spectral range. The second, source D (labeled 46), is a single-frequency source, whose frequency is aligned with a different mode of the router.

The optical signals exiting ports 1, 2, and 4 of router 20 are shown in the lower part of FIG. 4, in the portions designated #1, #2, and #4, respectively. Since the spectra from sources A and B each cover at least one FSR, several distinct frequencies emerge from each port in both the first and second band. Sources A and B thus establish broadcast connections. That is, each port receives signals with essentially the same modulation, albeit at different wavelengths. These broadcast connections may be used to provide broadcast or switched services. As an illustrative example, source A may be modulated with television signals destined for all subscribers (broadcast service), while source B may be modulated with telephone conversations (switched service), which may be segregated by TDM or SCM means. Each of source C's four frequencies emerges on a different output port of the router 20, thereby establishing switched connections. These switched connections may be used to provide broadcast or switched services. As an illustrative example, each frequency of source C may be modulated with identical information to provide a broadcast service (also known as multicasting), or each frequency of source C may be modulated with distinct information to provide a private switched service. Finally, source D, whose output frequency is in a different FSR than source C's output, is employed to provide an additional private dedicated link to port 2 of router 20. It may be appreciated that FIG. 4 is merely illustrative and that many other signal assignments can be had. For example, one can realize that the electrical bandwidth of each service carried in a given FSR interval is very broad and can carry within it many signals, either through time division or subcarrier modulation. Indeed, the assignment of signals within the band may have to do mostly with considerations of provisioning and power delivered to the NIUs.

Figure 5:
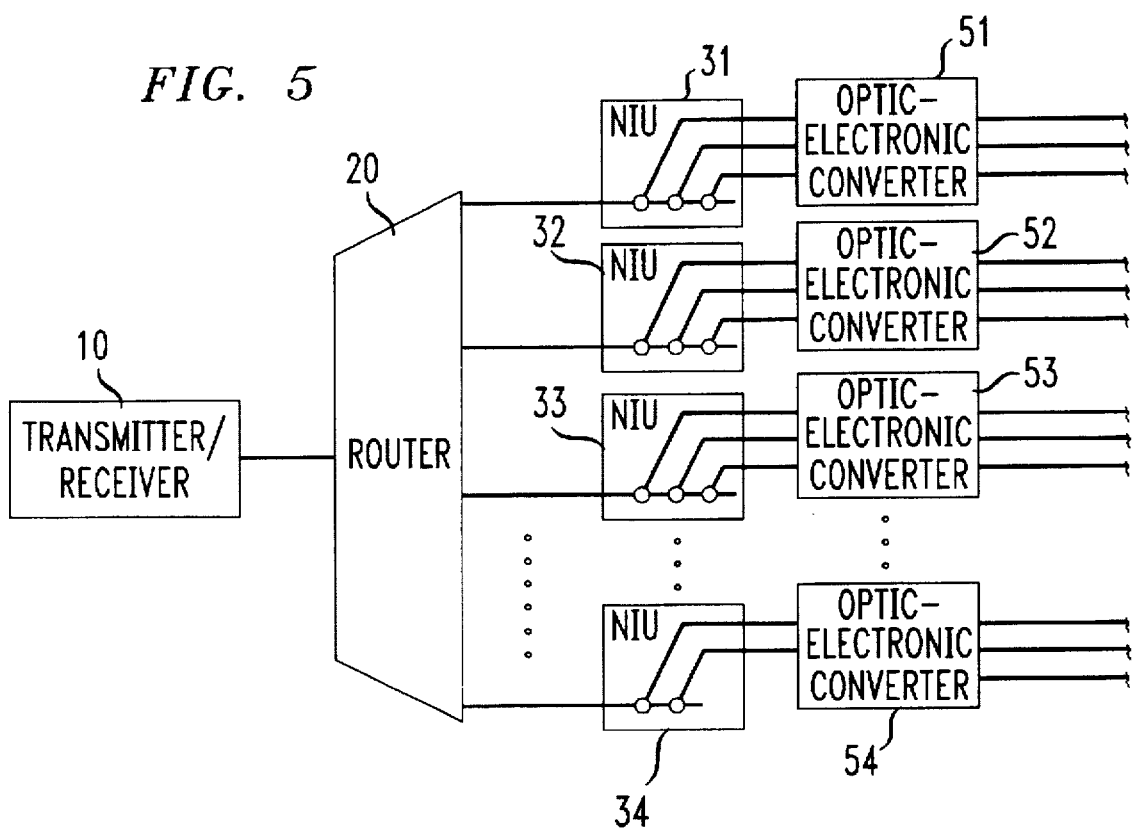
FIG. 5 presents one possible embodiment of a head station connected to a WDM router by a feeder fiber, the router in mm connected to NIU's by distribution fibers. Each NIU can contain coarse WDM demultiplexers used to segregate the optical signals occupying distinct optical frequency bands as in FIG. 4.

FIG. 5 presents an embodiment that shows the manner in which the signals delivered at the output ports of router 20 may be utilized. Each output port of router 20 is connected to an NIU and within each NIU there are tuned couplers that "peel off" an optical signal, and therefore a service, in a particular "Band". Those couplers need to be wavelength selective only to the extent that different signals are expected out of the particular router port to which the NIU is connected. For a system where station 10 creates a transmitted signal of the type described in connection with FIG. 4, the most stringent arrangement requires the couplers to be selective only to approximately one FSR interval. In FIG. 5, NIUs 31, 32 and 33 include three couplers each, and NIU 34 has only two couplers. For example, the couplers in NIU 31 of FIG. 5 may be timed to receive broadcast signals in the first and second bands and one switched signal in the third band of FIG. 4. The couplers in NIU 32 may be tuned to received the first broadcast signal band and both switched signal bands, and so on.

Of course, the optical signals developed at each NIU are usually demodulated and converted to electronic form, and to that end, each NIU in FIG. 5 is shown connected to an opto-electronic converters (51, 52, 53, and 54). As one skilled in the art will appreciate, these opto-electronic converters may also comprise optical switches, sources for upstream communication, electronic switches, diagnostic equipment, and so forth.

Each of the switched signals that an NIU receives can correspond to a different address or "telephone number." Alternatively, through time division multiplexing, or subcarrier multiplexing, each one of the switched signals can correspond to the signals of a number of "telephone numbers". The signals of a "telephone number" can, in turn, correspond to POTS service, or can be communication of any desired sort that provides multi-media access to the NIU.

Although not explicitly depicted in the NIU diagram, it is understood, of course, that each NIU can also include means for sending information back to the head station. This can be implemented in any number of ways including as taught, for example, in U.S. patent application Ser. No. 08/333,926, filed Nov. 3, 1994, and Ser. No. 08/439,059, filed Apr. 3, 1996, by T. Darcie, N. Frigo and P. Magill. Viewed generally, the return signal from the "telephone numbers" can be at the same wavelength, again using time division multiplexing or SCM, or it can be at a different wavelength to exit a port that is different from the input port, or it can be in another FSR interval.

Figure 3:
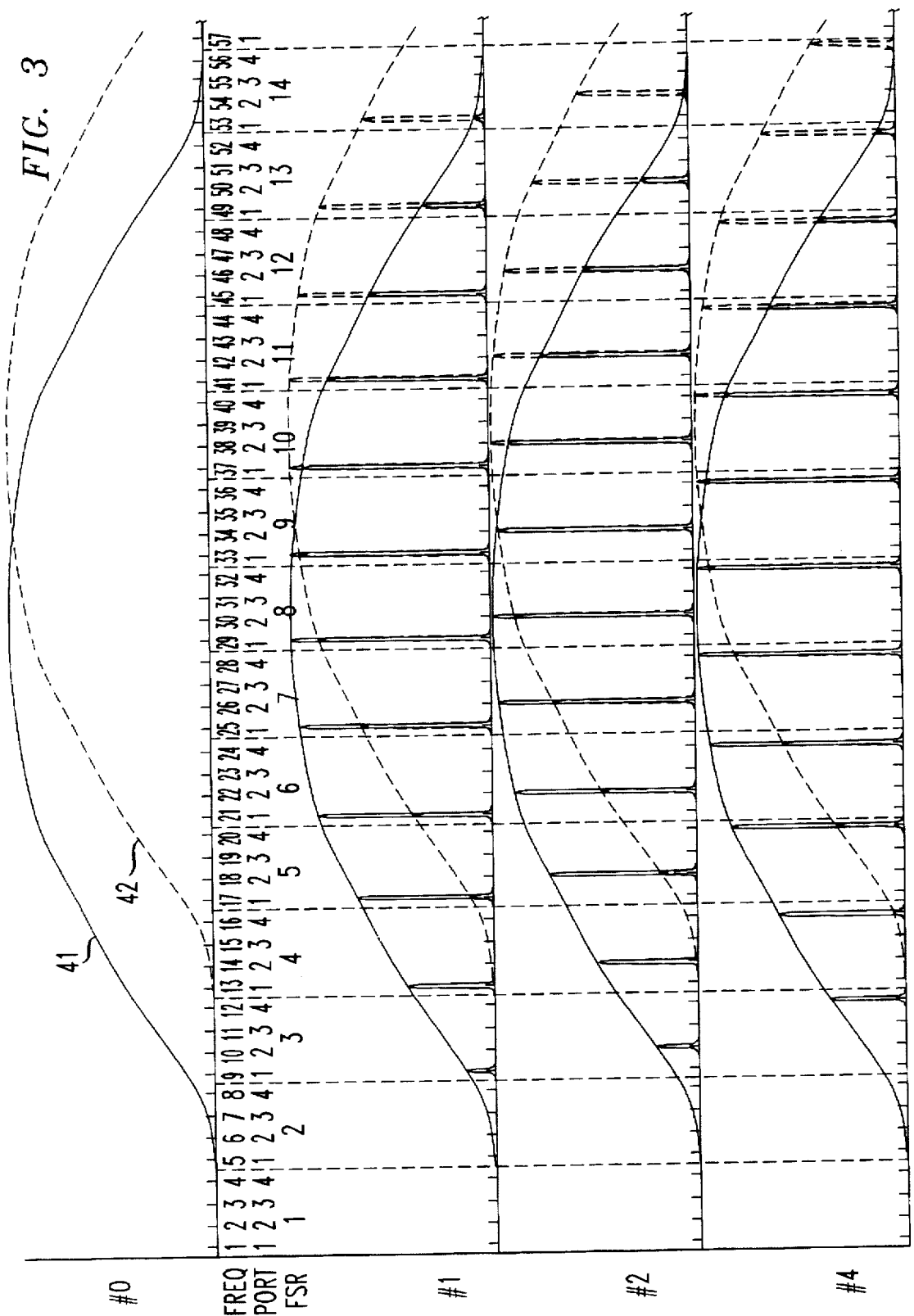
FIG. 3 presents a pictorial view of the spectra delivered at the output ports of a wavelength division multiplexing router, in the case where the input comprises of two broad overlapping optical spectra.
Figure 6:
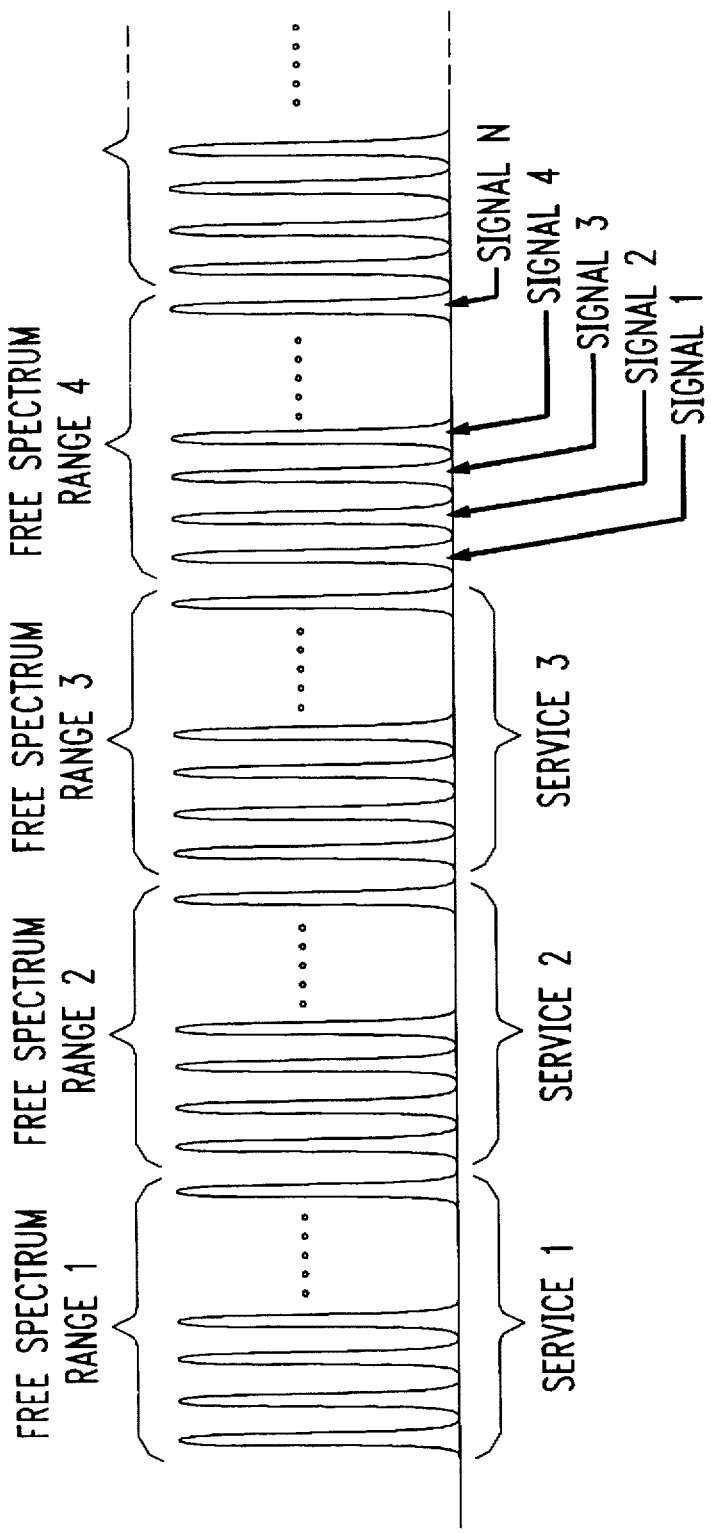
FIG. 6 presents the spectral allocation for one possible embodiment. Adjacent optical frequency bands are used, each service utilizes the minimum bandwidth of one FSR, and consists of N discrete frequency channels.

FIG. 6 presents one possible extension of the concepts illustrated in FIG. 4, whereby the overall optical spectrum is used in a more efficient manner. Each FSR interval in a band or in a collection of bands (whether contiguous or not) is devoted to a different service, providing many independent (and potentially different) services to the output ports of router 20. The bands could even extend to cover more than a single telecommunication band. For example, the optical communication arts often utilize communication bands centered about 1.3 μm and 1.5 μm. As shown in FIG. 6, not only does each adjacent FSR interval contain a different service, but a multi-frequency source might be employed in each case rather than a source with a broad spectral output. Each signal within a given FSR, shown in FSR 4 as signals 1 through N, is aligned with a particular mode of the router 20, and therefore emerges on a unique router port, representing a distinct switched connection. Not surprisingly, such efficient use of the optical spectrum (i.e. much more efficient use than A and B in FIGS. 3 and 4) adds complexity to the network. For instance, since the router 20, as part of the outside plant, may be subjected to temperature variations, it may be necessary for the optical source(s) in the transmitter to track temperature dependent changes in the absolute frequencies of the router modes. Temperature tracking is not a concern when sources with broad spectral outputs (such as LEDs) are employed and inefficiencies can be tolerated, as in FIGS. 3 and 4. Furthermore, using adjacent FSRs puts more stringent requirements on optical filters or coarse WDM couplers used at the NIUs to segregate services since their selectivity is on the order of a router mode spacing, or N times more selective than the FSR. These and other implementation issues will be discussed in more detail in the following sections.

Figure 7:
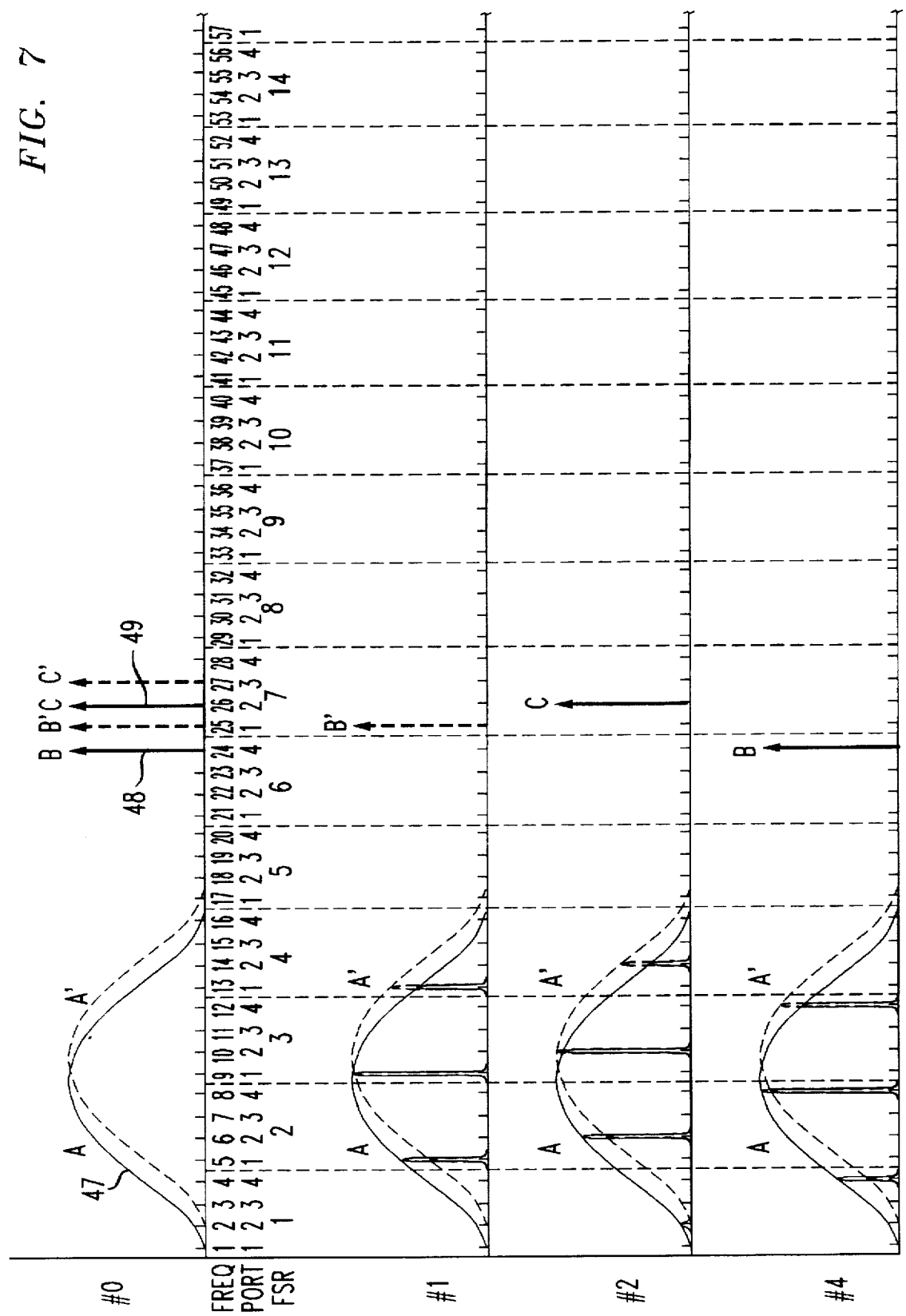
FIGS. 7–9 present pictorial views of various spectral allocation plans, and the resulting spectra emerging from the outputs of the WDM router.

FIG. 7 illustrates some of the deleterious consequences of a shift between the source frequencies and the frequencies of the router modes. As mentioned previously, such a frequency shift could be caused by a change in the temperature of router 20, or by other physical mechanisms such as aging. For clarity, FIG. 7 shows the optical source frequencies shifting, with the router modes fixed. Clearly, in terms of the relative frequencies and port connections, this situation is equivalent to the case in which the source frequencies remain fixed, while the router modes shift. The upper trace (marked #0) shows one broad optical spectrum and two discrete optical frequencies, labeled A, B, and C, labeled 47, 48, and 49 respectively. In each case, the optical spectrum (solid lines) is shown to shift to the right (dashed lines) by one mode spacing of router 20.

Optical spectrum A spans more than one FSR, and therefore establishes broadcast connections between the transmitter 10 and the NIUs. The effect of spectrum A (solid curve) shifting to spectrum A' (dashed curve) can be seen in the lower traces, which illustrate the spectral output of router ports 1, 2, and 4. The power per router mode varies, but since the input spectrum spans more than one FSR, the signal is still received at each port. Furthermore, the drop in power for modes derived from the leftmost part of spectrum A is somewhat compensated by an increase in power for modes derived from the rightmost part of spectrum A.

The situation is substantially different for optical signals B and C, which have been employed to establish private switched connections between the transmitter 10 and NIUs connected to router ports 4 and 2, respectively. Since these signals are aligned to particular modes of the router 20, the shift in frequency results in the shifted spectra B' and C' arriving at the wrong destinations. Signal B now emerges from port 1, while signal C emerges from port 3 (for simplicity, the optical spectra emerging from port 3 are not shown).

As shown in FIG. 7, the embodiment of FIG. 5 is more or less sensitive to relative shifts in frequency between the transmitter spectrum and the router modes, depending on the exact configuration of the network. If a broadband optical source, such as an LED, is employed at the transmitter with the intention of making broadband connections, the performance of the network may be acceptable even if the relative frequencies have shifted. If, on the other hand, narrowband optical sources such as single- or multiple-frequency lasers are employed at the transmitter with the intention of making switched connections, the network design must include a means for the reduction of the effects of drift. Both active and passive solutions to this frequency drift problem are possible. An example of an active solution is the use of frequency tracking. Frequency tracking refers to a method whereby the drift induced in one component by environmental or physical changes is compensated by applying a so-called error signal to one or more components in the system, in order to commensurably shift the frequencies of these components, such that the deleterious effect of the frequency shift is negated. Generally, the hub station will have control of the wavelengths, although it may use information provided by the NIUs to evaluate the changes that are necessary. In the alternative, an example of a passive solution which avoids tracking is the use of a router with modes characterized by spectral widths large relative to any foreseeable drift in relative frequency. This solution, of course, reduces the bandwidth efficiency of the network.

Figure 8:
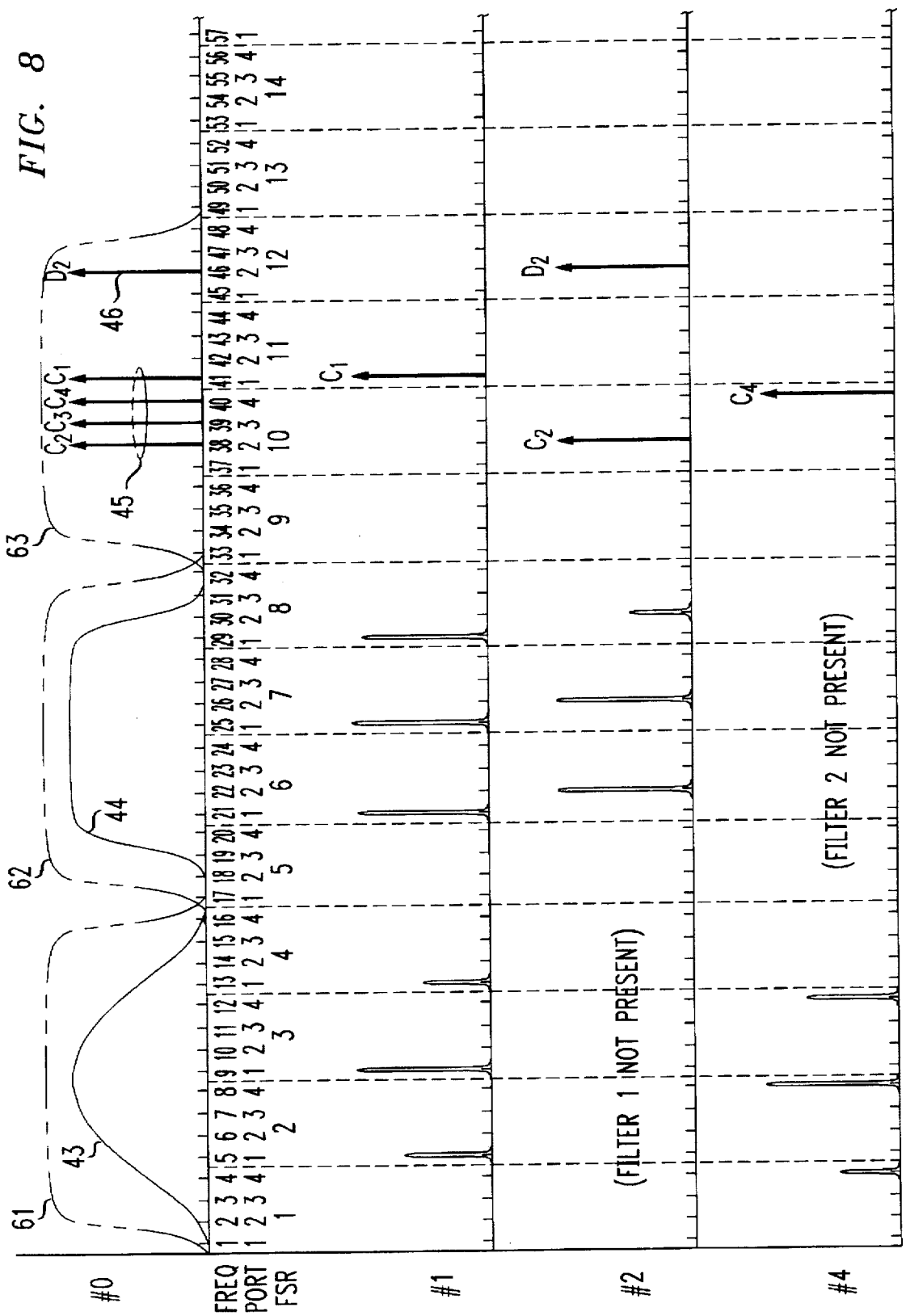

FIG. 8 illustrates the use of frequency selective optical couplers at NIUs 1, 2, and 4 of FIG. 5. In this particular example, three optical frequency bands are employed to transmit multiple services. The optical spectra directed from transmitter 10 to router 20 are shown in solid lines in the top portion of FIG. 8 (marked #0). The 43, 44, 45 and 46 spectra are the same as in FIG. 4. Spectra A and B are broad optical spectra spanning at least one FSR of the router, and therefore establish broadcast connections with all router output ports. The third optical band contains discrete frequencies from two sources, C (a multiple frequency source) and D (a single frequency source), which are again aligned to particular modes of router 20 and therefore arrive at particular NIUs, establishing switched connections. The dashed lines, labeled 61, 62, and 63, represent the frequency dependent transmission characteristics of the frequency selective optical couplers which can be employed at the NIUs to select the desired service mix. It will be appreciated by one skilled in the art that a comparable set of such couplers may well be used at transmitter 10 to multiplex sources.

The three lower traces in FIG. 8 show the optical spectra arriving at the opto-electronic converters associated with NIUs 1, 2, and 4. NIU #1 employs all three coupler types to receive portions of broadcast signals A and B, and a private switched connection at frequency $C_1$. User #2 has subscribed to services 2 and 3 only, and therefore his NIU includes only coupler types 62 and 63. Note that he has also subscribed with service provider 3 for an additional private dedicated channel at frequency $D_2$. The information contained within band 63 on frequencies $C_2$ and $D_2$ must be further segregated, either with an additional optical filter before the opto-electronic (O-to-E) conversion or by electronic means, such as according to RF subcarrier frequency, after the O-to-E. Finally, NIU#4 includes wavelength selective couplers 61 and 63 only, and therefore receives a portion of broadcast signal A and a discrete frequency at $C_4$, corresponding to a private switched connection. Although the illustrative implementation described here employs frequency selective couplers at the NIUs to segregate optical frequency bands, other similar techniques can be employed. For example, a standard optical power splitter with each arm connected to an optical filter can provide the frequency selectivity of a frequency selective coupler, albeit at the cost of 3 dB additional loss due to splitting.

Figure 9:
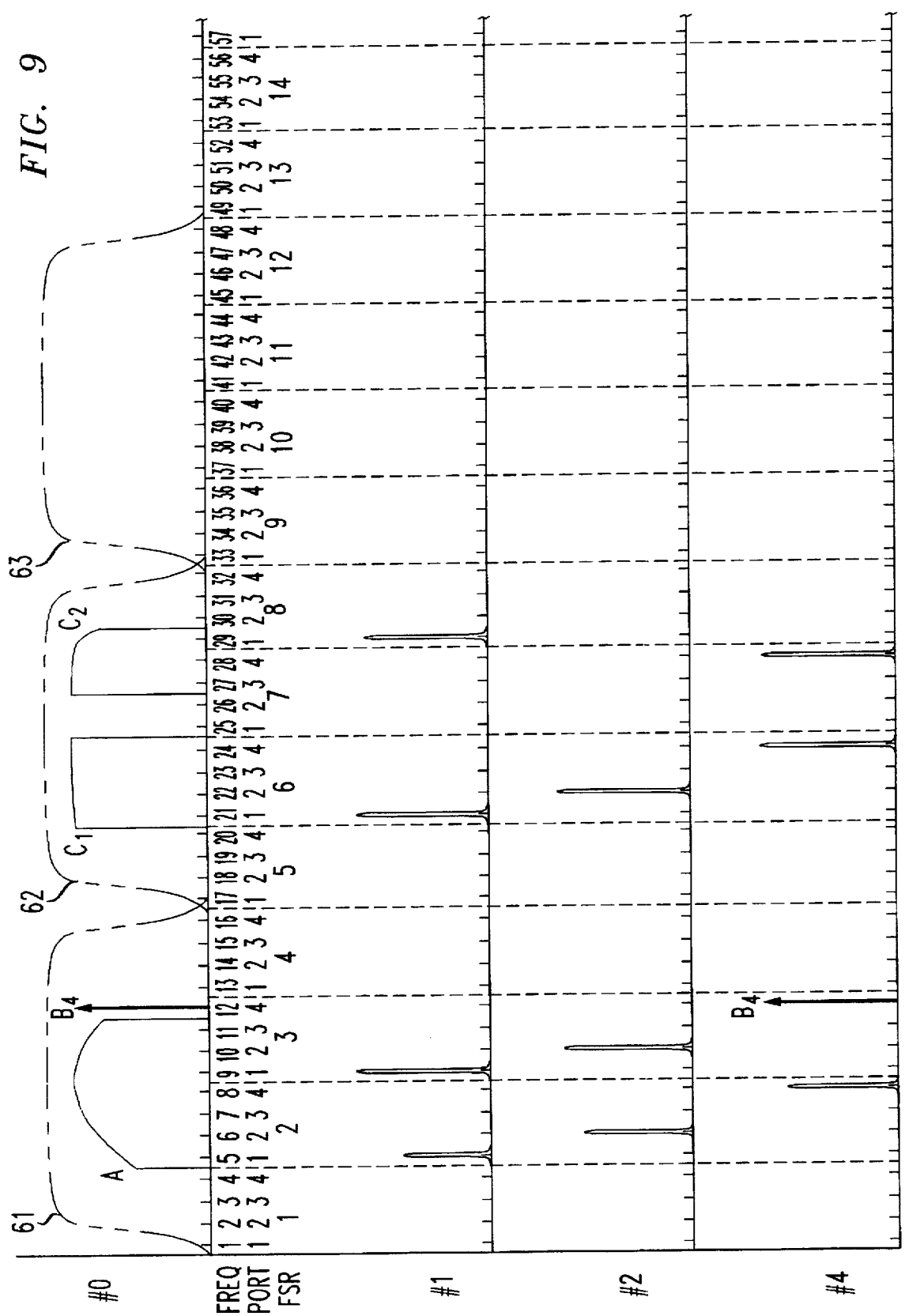

Further optical bandwidth efficiencies and improved optical crosstalk rejection can be achieved by pre-filtering the optical spectra at the transmitter 10, as shown in FIG. 9. Here the aggregate optical band is again apportioned into three bands, labeled 61, 62, and 63. As per FIG. 8, a service or services can be accessed by the subscriber by including the appropriate filter(s) in his NIU. The upper trace shows the three bands in dashed lines and the transmitted spectra in solid lines. Within band 61, two sources, A and $B_4$, have been employed. Source A is a broadband source which has been prefiltered to span two FSRs of router 20, thus freeing bandwidth within band 61 for additional services. Source $B_4$ is a single frequency source whose output spectrum has been tuned to emerge from router port number 4. Within band 62, a single broadband source, C, has been segmented by prefiltering. One segment, $C_1$, spans one FSR of router 20, while the other segment, $C_2$, spans three modes of router 20 (less than one FSR). These two segments can be independently modulated to provide two distinct services. Band 63 is unused in this example.

The lower three traces in FIG. 9, show the optical spectra emerging on router ports 1, 2, and 4. Since spectrum A spans almost two FSRs of router 20, one or two "slices" of spectrum A emerge from each router port, establishing broadcast connections. Frequency $B_4$ emerges from port 4, establishing a dedicated switched connection between the transmitter and NIU 4. Spectrum $C_1$, which spans one FSR, establishes broadcast connections, with each router port receiving one "slice" of $C_1$. Spectrum $C_2$, which spans three of the four modes constituting a FSR, provides a multicast connection, with all ports except port 1 receiving the multicast transmission. These examples are illustrative of the flexibility possible in delivering services in various combinations of transport connections, but are by no means exhaustive of the possibilities.

FIGS. 10A-10D and 11A-11B present a number of illustrative embodiments of the optical transmitters/receivers, and their use in forming central office (CO) embodiments, respectively.

Figure 10A:
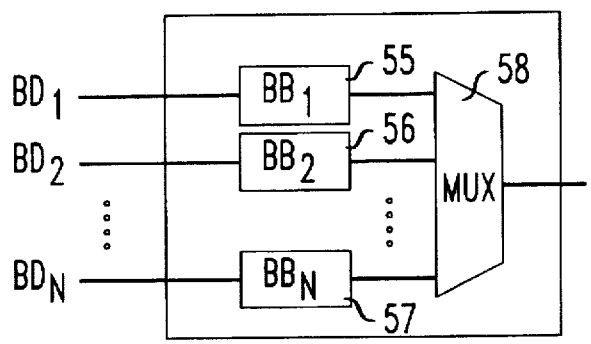
FIG. 10A–10D present various implementations of source and receiver modules as employed in the CO.

FIGS. 10A-10D show three source embodiments and one receiver embodiment. FIG. 10A represents a broadcast source, composed of N broadband optical sources ($BB_j$) each with output optical spectrum occupying a distinct band (or bands) of frequencies. Each broadband source can be modulated with a distinct data signal, shown as $BD_1$ through $BD_N$ and labeled 55-57. The N broadband optical signals are combined onto the feeder fiber in a coarse multiplexer 58, which is either essentially identical to the coarse frequency-selective coupler de-multiplexer contained in each NIU 31 of FIG. 5, or is an integrated coarse WDM multiplexer, or is a standard frequency insensitive passive power combiner (Of course, the use of a passive combiner increases the loss experienced by each of the optical signals). Each broadband source $BB_j$ can consist of one of several classes of optical sources, such as a ultrashort-pulse mode-locked laser, whose output is necessarily broadband due to the short temporal duration of each pulse, or a light emitting diode (LED), or a fiber amplifier, such as an erbium-doped fiber amplifier (EDFA), etc. Furthermore, each broadband source, $BB_j$, may contain optical filters for performing optical prefiltering, as described previously. The broadcast data signals, $BD_j$, can contain analog data signal, digital data signal, subcarrier-multiplexed data signal, or a combination of such signals.

Figure 10B:
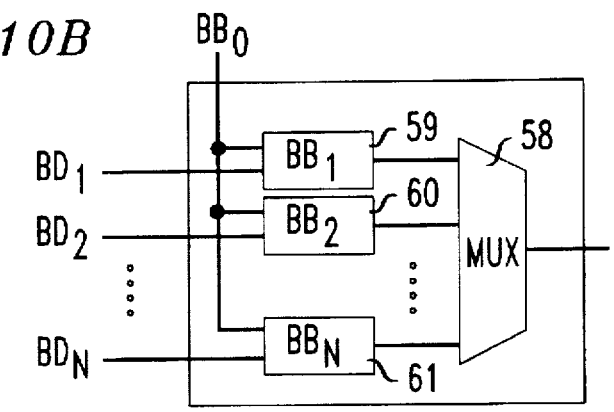

FIG. 10B, illustrates a variation of the broadcast source, for which a single broadband optical source, $BB_0$, provides the light to each of the individually addressable broadband transmitters, $BB_1$ through $BB_N$ labeled 59, 60, 61). These broadband transmitters comprise a modulator (or gated amplifier) and an optical filter, for instance.

Figure 10C:
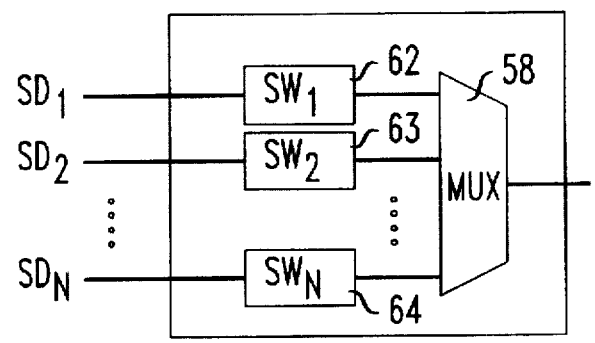

FIG. 10C represents a switched source, composed of N narrowband optical transmitters, shown as $SW_1$ through $SW_N$ and labeled 62, 63, 64, each with output optical spectra aligned to a distinct single mode of the waveguide-grating router 20 in FIG. 1. Each switched source can be modulated with a distinct data signal, shown as $SD_1$ through $SD_N$. As examples, the N narrowband optical signals are combined onto the feeder fiber in a multiplexer, comprising either a passive power combiner, or a waveguide-grating router, with mode separation either identical to that of router 20 or essentially an integer multiple of that of router 20, or an integrated coarse WDM multiplexer. Each narrowband source, $SW_j$, can consist of one of several classes of narrowband optical sources, such as a distributed feedback (DFB) laser, a tunable distributed Bragg reflector (TDBR) laser, etc. Furthermore, these discrete sources may be combined in a single integrated multiple-frequency source, such as a DFB array, or a waveguide-grating router laser, etc. The switched data signals, $SD_j$, can contain analog data, digital data, subcarrier multiplexed data, or a combination.

A variation of the switched source, which is not shown explicitly, is similar to the broadcast source shown in FIG. 10B. A single source, $BB_0$, provides the light to each of the individually addressable transmitters, $SW_1$ through $SW_N$. These transmitters comprise, illustratively, a modulator (or gated amplifier) and a narrowband optical filter, which ensures that the spectrum from each transmitter is narrower than a single mode of router 20 in FIG. 1.

Figure 10D:
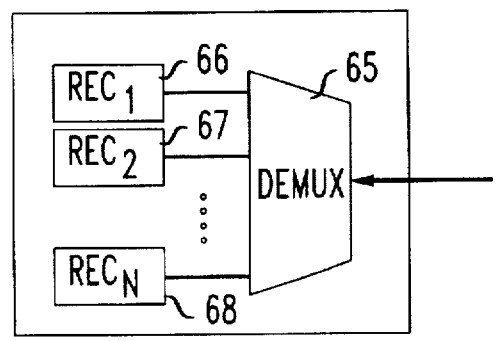

FIG. 10D shows a schematic of the receiver module, comprising a wavelength selective de-multiplexer 65 and a set of receivers $R_1$ through $R_N$ labeled 66, 67, 68. Various optical frequency bands containing upstream data are segregated by the de-multiplexer and converted to electrical signals by the receivers. As for FIGS. 4,5,8, and 9, these optical frequency bands may be segregated according to user, in which case the de-multiplexer is an essentially identical router to router 20 in FIG. 1, whose modes are aligned to match those of router 20, or may be segregated according to service, in which case a coarse WDM de-multiplexer may be employed, or some combination of these cases.

It will be appreciated by one skilled in the art that more than one of these sources can be multiplexed together to form transmitter 10.

Figure 11A:
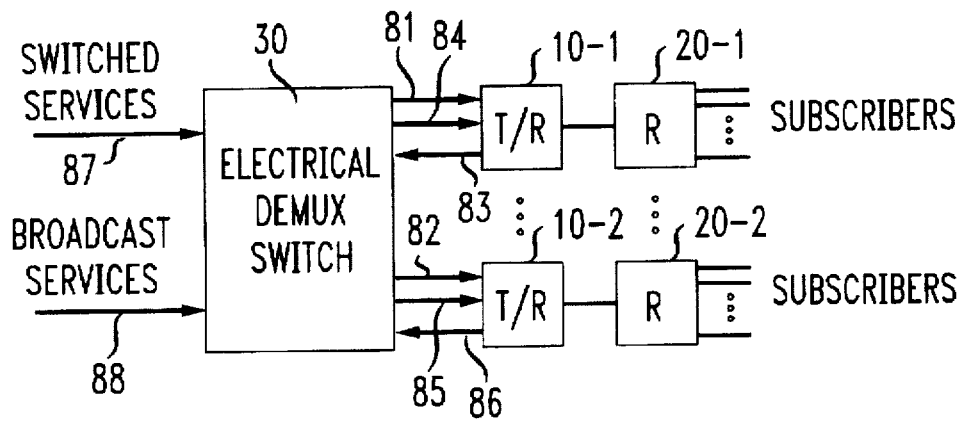
FIGS. 11A–11B present CO embodiments, illustrating both the CO's connections to subscribers, and the CO's connections to various service providers (suppliers).
Figure 11B:
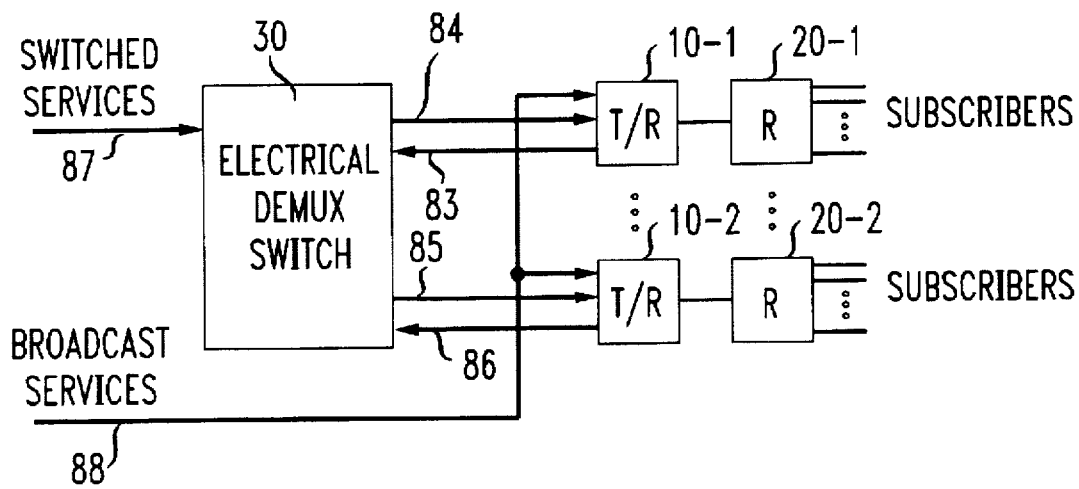

FIGS. 11A-11B present simplified embodiments of a head station, effectively serving as a large central office (CO). In FIG. 11A, the CO is shown to have a plurality of transmitter/receiver modules, 10-1, 10-2, each serving a set of subscribers through corresponding routers 20-1, 20-2. Switch 30 interacts with the transmitter/receiver modules. It receives both switched and broadcast services on lines 87 and 88, switches them as required, and applies those signals to the transmitter/receiver modules via lines 81, and 82 for broadcast services, and lines 84 and 85 for switched services. Signals received from the subscribers are applied to switch 30 via lines 83 and 86. Not shown, but implicitly present, are electrical and optical connections to other COs, other telecommunication networks, and other service providers, as well as switching, multiplexing, demultiplexing, and diagnostic equipment in the CO, for instance.

FIG. 11B is similar to FIG. 11A, except that it demonstrates the flexibility of having the broadcast services, perhaps provided by companies that are unaffiliated with the telecommunications provider, receiving optical or electrical access to the transmitter/receiver modules directly.

While we have concentrated on the downstream signals, it will be appreciated that some services will require upstream (i.e., subscriber-to-hub) communications, which will be coordinated by the hub and received by the transmitter/receiver module 10.

Figure 12:
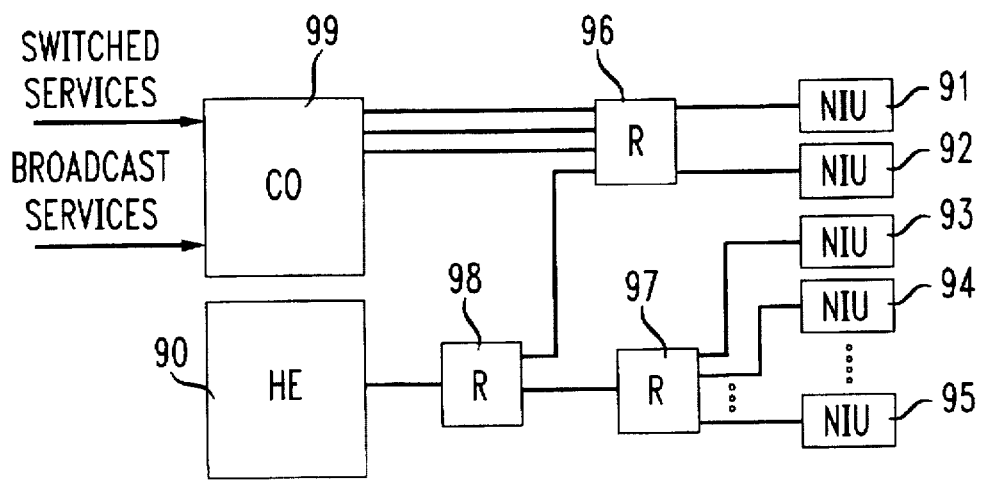
FIG. 12 shows a network embodiment in which a CO and a broadcast head-end simultaneously share the same distribution plant to deliver diverse services.

FIG. 12 shows a network embodiment in which a CO 99, as described above, and a broadcast head-end (HE) 90 simultaneously share the same distribution plant to distribute diverse services. In the cable television industry, shared feeder cables and/or fiber-optic supertrunks emanate from a head-end, where local programming is bundled with other electrical broadcast signals prior to transmission. We retain this terminology, to distinguish the HE from a central office, which we consider to be an outgrowth of the traditional switching center for a single local telephone exchange serving approximately 10,000 subscribers. Broadband broadcast signals are illustratively transmitted from HE 90 on a single feeder fiber, passively split using an optical power splitter 98, and distributed to routers 96 and 97. These routers are similar to those shown in FIG. 1 except that they are designed to have multiple input ports, some of which can be used to accommodate the optical signals from one or more HE(s). See the above-cited prior art article titled "An N×N Optical Multiplexer Using a Planar Arrangement of Two Star Couplers." Naturally, this embodiment presupposes a level of cooperation between the CO and any HE(s) which might share distribution networks, since in general it will be desired to keep the bands used by the respective service providers distinct and the design of the NIUs uniform.

Although FIG. 6 presents the notion of each FSR interval being assigned its own service, and some of those services are broadcast services, it should be appreciated that the spirit and scope of this disclosure includes combining a number of FSR intervals for one service (which might increase the power delivered to the NIUs), and it also includes leaving some FSR intervals empty to serve as buffers or guard bands that allow for more lenient design requirements for the filters within station 10. For example, if FSR intervals 2, 4, 6, etc. are left unused, two benefits result. First, filters can be made less sharp and, second, the precision of the positioning of the cutoff frequencies need not be as precise. That is, a service can occupy one or more contiguous or non-contiguous FSR intervals and services can be separated by no FSR intervals, or any number of FSR intervals, including a fraction of one FSR interval. In connection with the notion that services may be separated by any amount, it may be noted that if, for example, FSR interval 1 "starts" with output at the first port of router 20 and a service is set half-way between FSR interval 2 and FSR interval 3, and is one FSR interval wide, then that service will provide a signal to all output ports of the router, "starting" with the middle port of the router. Of course, which port is designated the "first" port is purely a matter of choice.

We have not concentrated on the upstream direction, but the same broadcast and switched issues appear there. All of the various techniques heretofore disclosed (such as loopbacks, diagnostics, etc.) can, in one form or another, find use in and provide benefits to systems embodying the principles disclosed herein.

We claim:

1. An arrangement comprising a head station and a router connected to the head station, where the router comprises an input port and a P plurality of output ports and is such that, for a broadband signal injected at the input port, a) output port j of the P output ports delivers a signal containing a set of wavelengths $f^j, f^{j+N}, f^{j+2N}, f^{j+3N}, \ldots, f^{j+mN}$, the spectral interval between wavelength $f^{j+nN}$ and wavelength $f^{j+nN+N}$ being known as the free spectral range (FSR), the interval $\lambda^{j+1} - \lambda^j$ is the nominal channel spacing, and b) the set of wavelengths of a signal at one of the output ports is, to a first degree of approximation, mutually exclusive from the sets of wavelengths of signals at all other output ports when only one input is illuminated, wherein the improvement comprises:

an information signal in said head station; and a carrier signal source in said head station which develops a signal that is modulated by the information signal and which spans not more than m FSR intervals, where m is a number, thereby forming a broadcast signal that is delivered to the router via an output port of the head station.

2. The arrangement of claim 1 where m is less than 3.

3. The arrangement of claim 1 where m is 1.

4. The apparatus of claim 1 where said information signal comprises a plurality of different signals that are combined in a TDM or SCM manner.

5. The arrangement of claim 1 further comprising:

a multiplexer interposed between the broadcast signal and the output port of the head station;

a second information signal in said head station; and a second carrier signal source in said head station which develops an output signal that is modulated by the second information signal and spans not more than n FSR intervals, where n is a number, where the n FSR intervals do not overlap the m FSR intervals, and where the output signal of said second carrier signal is delivered to the multiplexer to be combined with the broadcast signal.

6. The arrangement of claim 5 where the broadcast signal and the output signal of said second carrier are at adjacent FSR intervals.

7. The arrangement of claim 5 where the broadcast signal and the output signal of said second carrier are separated by one FSR interval.

8. The arrangement of claim 5 where the broadcast signal and the output signal of said second carrier are separated by less than one full FSR interval.

9. The arrangement of claim 5 where broadcast signal and the output signal of said second carrier are in the same telecommunication band.

10. The arrangement of claim 5 where the wavelength of the broadcast signal and the output signal of said second carrier are within 100 nm of each other.

11. The apparatus of claim 5 where said information signal comprises a plurality of different signals that are combined in a TDM or SCM manner, and said second information signal comprises a plurality of different signals that are modulated in a TDM or SCM manner.

12. The arrangement of claim 5 where the head station applies the output signal of the multiplexer to another output port, for connection to another router.

13. The arrangement of claim 1 further comprising:

a multiplexer interposed between the broadcast signal and the output port of the head station;

a plurality of private signals in said head station; and a source for a plurality of second carrier signals, which source includes means for modulating each of the plurality of carrier signals by a different one of the private signals, the modulated plurality of second carrier signals forming a signal that spans not more than n FSR intervals, where n is a number and where the n FSR intervals do not overlap the m FSR intervals, the signal being delivered to the multiplexer to be combined with the broadcast signal.

14. The arrangement of claim 13 where n is 1.

15. The arrangement of claim 13 where the broadcast signal and the point-to-multipoint signals are separated by not more than 2 FSR intervals.

16. The arrangement of claim 13 where the broadcast signal and the point-to-multipoint signals are separated by one FSR interval.

17. The arrangement of claim 13 where the wavelengths of the broadcast signal and the point-to-multipoint signals are separated by less than one FSR interval.

18. The arrangement of claim 13 where the broadcast signal and the point-to-multipoint signals are within 100 nm of each other.

19. The arrangement of claim 13 where n is less than 3.

20. The arrangement of claim 13 further comprising:
a second multiplexer having an input coupled to said broadcast signal;
a second plurality of private signals;
a second source for a third plurality of carrier signals, which source includes means for modulating each of the third plurality of carrier signals by a different one of the second plurality of private signals, the modulated plurality of third carrier signals forming a signal that spans not more than n FSR intervals, where n is a number and where the n FSR intervals do not overlap the m FSR intervals, the signal being delivered to the second multiplexer to be combined with the broadcast signal and delivered to a second output port of the head station.

21. The arrangement of claim 20 wherein the n FSR intervals of the source of second plurality of carrier signals and the n FSR intervals of the second source for a third plurality of carrier signals span the same spectrum.

22. The arrangement of claim 1 employing another input port of the router for connection to another head station.

23. The arrangement of claim 1 where the head station applies said broadcast signal to another output port, for connection to another router.

24. The arrangement of claim 1 wherein said carrier signal is a broadcast/multicast signal having a spectral width which is greater than the nominal channel spacing.

25. In an arrangement comprising a head station and a router connected to the head station, where the router comprises an input port and a P plurality of output ports and is such that, for a broadband signal injected at the input port, a) output port j of the P output ports delivers a signal containing a set of wavelengths $f^j$, $f^{j+N}$, $f^{j+2N}$, $f^{j+3N}$, ... $f^{j+mN}$, the spectral interval between wavelength $f^{j+nN}$ and wavelength $f^{j+nN+N}$ being known as the free spectral range (FSR), the interval $\lambda^{j+1}-\lambda^j$ is the nominal channel spacing, and b) the set of wavelengths of a signal at one of the output ports is, to a first degree of approximation, mutually exclusive from the sets of wavelengths of signals at all other output ports when only one input is illuminated, a method comprising the steps of:
developing a carrier signal source in said head station which spans not more than m FSR intervals, where m is a number; and
modulating the carrier signal source with an information signal, thereby forming a broadcast signal that is delivered to the router via an output port of the head station.

26. The method of claim 25 where m is either 1.

27. The method of claim 25 where said information signal comprises a plurality of different signals that are combined in a TDM or SCM manner.

28. The method of claim 25 further comprising the steps of:
developing a plurality of carrier signals that reside in a band which spans not more than n FSR intervals, where n is a number, where the n FSR intervals do not overlap the m FSR intervals;
modulating the plurality of carrier signals by different input signals to form modulated "private" carrier signals; and
combining the modulated "private" carrier signals with the broadcast signal to form a combined signal and delivering the combined signal to the output port of the head station.

29. The method of claim 28 where the m FSR intervals and the n FSR intervals are at adjacent FSR intervals.

30. The method of claim 28 where the m FSR intervals and the n FSR intervals are separated by one FSR interval.

31. The method of claim 28 where the m FSR intervals and the n FSR intervals are separated by less than one full FSR interval.

32. The method of claim 28 where the m FSR intervals and the n FSR intervals are in the same telecommunication band.

33. The method of claim 28 where the wavelength of the m FSR intervals and the n FSR intervals are within 100 nm of each other.

34. The method of claim 25 further comprising the steps of:
developing a second carrier signal that resides in a band which spans not more than n FSR intervals, where n is a number, where the n FSR intervals do not overlap the m FSR intervals;
modulating the second carrier signal by a second information signal to form a second broadcast signal; and
combining the second broadcast signal with the broadcast signal to form a combined signal and delivering the combined signal to the output port of the head station.

35. The method of claim 34 where the broadcast signal and second broadcast signal are separated by not more than 2 FSR intervals.

36. The method of claim 34 where the broadcast signal and the second broadcast signal are separated one FSR intervals.

37. The method of claim 34 where the broadcast signal and the second broadcast signal are separated less than one FSR intervals.

38. The method of claim 34 where the broadcast signal and the second broadcast signal are within 100 nm of each other.

39. The method of claim 25 where m is less than 3.

40. The method of claim 25 wherein said carrier signal is a broadcast/multicast signal having a spectral width which is greater than the nominal channel spacing.

* * * * *